United States Patent [19]

Ricklefs et al.

[11] Patent Number: 5,632,153

[45] Date of Patent: May 27, 1997

[54] SYSTEM AND PROCESS FOR CLEANSING BRINE IN A FOOD-CHILLING CIRCUIT

[75] Inventors: Raymond E. Ricklefs, Anamosa, Iowa; George J. Cocoma, Edmond, Okla.

[73] Assignee: Foodbrands America, Incorporated, Oklahoma City, Okla.

[21] Appl. No.: 518,984

[22] Filed: Aug. 24, 1995

[51] Int. Cl.⁶ .................................... F25B 47/00
[52] U.S. Cl. ................ 62/85; 62/475; 62/373; 426/649; 426/652
[58] Field of Search ................ 62/85, 292, 475, 62/373, 374, 376, 434, 435, 430; 210/768, 767, 651, 259; 426/331, 332, 649, 652

[56] References Cited

U.S. PATENT DOCUMENTS 5,173,190  12/1992  Picek .................................... 210/259
5,377,492   1/1995  Robertson et al. ...................... 62/374

*Primary Examiner*—John M. Sollecito
*Attorney, Agent, or Firm*—Shook, Hardy & Bacon L.L.P.

[57] ABSTRACT

A system for cleansing brine used in a chilling circuit has a used brine receiving tank in fluid communication with the chilling circuit. A membrane or like filtration unit is in fluid communication with the used brine tank and removes particles having a molecular weight of greater than approximately 200 from the brine. A cleansed brine storage tank is in fluid communication with the filtration unit and the chilling circuit. The cleansed brine tank holds the brine after it has been cleansed by the filtration unit until it can be resupplied to the chilling circuit.

6 Claims, 1 Drawing Sheet

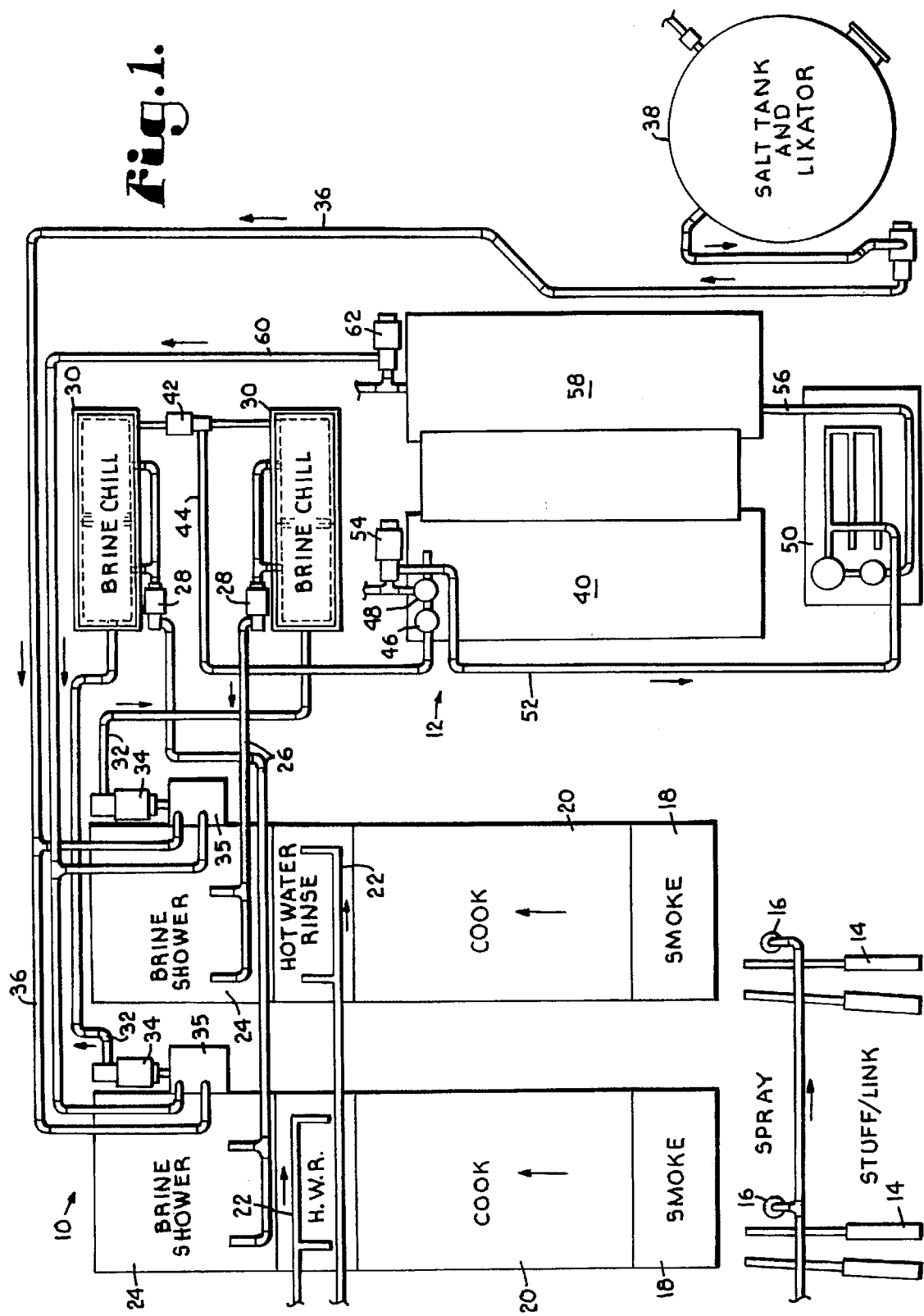

SYSTEM AND PROCESS FOR CLEANSING BRINE IN A FOOD-CHILLING CIRCUIT

BACKGROUND OF THE INVENTION

The present invention is directed to a system and process for cleansing brine used in a food-chilling circuit.

During the processing of various meat products, the products normally must be cooled after being cooked and prior to being packaged in order to prevent spoilage by reducing the opportunity for growth of undesired bacteria. For example, in the processing and packaging of sausage, the sausage is normally stuffed into casings, flavored with liquid smoke, cooked to desired temperature, cooled to an appropriate temperature, and then packaged. Government regulations to a large extent dictate the safe temperatures to which a product must be cooked and cooled and often prescribe the rate at which a particular product must reach the chilled temperature.

One commonly used method of chilling a meat product involves cascading a chilled brine over the meat product in a brine shower. The chilled brine is supplied to the brine shower by a brine chiller which uses standard refrigeration equipment to reduce the temperature of the brine. In order to increase the efficiency of this chilling process, brine that cascades off of and chills the meat product is collected in a sump and then returned to the brine chiller to be rechilled and recirculated to the brine shower. This arrangement allows for continuous recirculation of the brine to maintain a constant temperature within the brine shower. New brine is added to the recirculating chilling circuit as needed to maintain a constant volume of brine in the circuit.

The brine that repeatedly cascades over the meat product in the brine shower collects small meat particles, microorganisms and bacteria. The continuous use of the brine throughout a day or cycle of processing results in accumulation of these contaminants within the recirculating brine. Once the contaminants reach a predetermined level, the brine becomes unsuited for use. The brine is then, typically at the end of the processing day or cycle or after a maximum of five days under certain conditions, drained into the waste water system of the locality where the processing plant is located, or otherwise released into the environment. New brine is added to the chilling circuit prior to any additional processing. This periodic replacement of the brine in the chilling circuit allows the contaminant level to be kept within governmental standards.

However, as is apparent, the brine discharged to the waste water system or the environment contains relatively high concentrations of chloride. Oftentimes, the chloride level exceeds the allowable limit for the water treatment system or exceeds the allowable standards set for discharging the brine to the environment without further treatment. These problems associated with brine disposal result in increased costs for using brine-chilling systems, and thus, reduce the attractiveness of such systems to meat processors.

Therefore, a brine-chilling system is needed wherein the brine can be cleansed to remove contaminants, and thus reused to avoid or reduce the problems associated with the disposal of chloride containing brine.

SUMMARY OF THE INVENTION

One object of the present invention is to provide a system and process for cleansing brine in a recirculating chilling circuit used to chill food products so that the brine can be reused indefinitely and still maintain cleanliness standards.

Another object of the invention is to prevent the disposal of large volumes of chloride containing brine into a waste water system or the environment.

According to the present invention, the foregoing and other objects are obtained by using a system for cleansing brine used in a continuous recirculating chilling circuit for food products such as various meat products. The chilling circuit has a brine shower and a brine chiller in fluid communication to allow continuous recirculation of the brine between the shower and chiller. The cleansing system has a used brine receiving tank which is in fluid communication with the chilling circuit. The used brine tank holds the brine discharged from the chilling circuit. A membrane or like filtration unit is positioned in fluid communication with the used brine tank. The filtration unit removes particles of a preselected size, such as those having a molecular weight of greater than approximately 20,000 to 50,000, from the brine. The filtration unit utilizes a low-pressure membrane process for separating suspended solids from the brine without affecting the salinity of the brine. The unit uses a semi-permeable microporous membrane to perform the separation. A reconditioned brine storage tank is in fluid communication with the filtration unit and the chilling circuit. The reconditioned brine tank holds the brine after it has been cleansed by the filtration unit and until it can be resupplied to the chilling circuit.

Another aspect of the invention involves a process for cleansing brine that has been used in the chilling circuit. The chilling circuit has a brine shower and a brine chiller in fluid communication to allow continuous recirculation of the brine between the shower and chiller. The brine is removed from the chilling circuit and is conveyed from the chilling circuit through a filter arrangement to a first storage tank. The brine is then processed through the filtration unit and is thereafter conveyed to a refrigerated storage tank from which it can be returned to the chilling circuit. The filtration unit utilizes a low-pressure membrane process for separating suspended solids from the brine without affecting the salinity of the brine. The unit uses a semi-permeable microporous membrane to perform the separation.

Additional objects, advantages, and novel features of the invention will be set forth in part in the description which follows, and, in part, will become apparent to those skilled in the art upon examination of the following, or may be learned by practice of the invention. The objects and advantages of the invention may be realized and attained by means of the instrumentalities and combinations, particularly pointed out in the appended claims.

BRIEF DESCRIPTION OF THE DRAWINGS

In the accompanying drawing which forms a part of the specification and is to be read in conjunction therewith and in which like reference numerals are used to indicate like parts:

FIG. 1 is a diagrammatic top plan view of a meat processing system incorporating the brine cleansing system and process of the present invention, the direction of flow of the brine indicated by the arrows.

DETAILED DESCRIPTION OF THE PREFERRED EMBODIMENTS

Turning now to FIG. 1 in greater detail, a sausage processing arrangement is designated broadly by the numeral 10. The processing arrangement 10 embodies the brine cleansing system 12 of the present invention. As is apparent, although described with respect to sausage processing, the brine cleansing system of the present invention can be used with any type of food processing wherein it is necessary to cool the product before packaging, for instance, the processing of hot dogs, bacon, or other sliced meats. Further, the figure depicts two sausage processing lines in a parallel relationship wherein identical stations and structures are identified by the same reference numerals.

The first stations in the sausage processing arrangement involve the stuffing of the sausage casings with meat product and the linking of the stuffed casings as generally indicated by the numeral 14. The sausages are then transported through the pre-rinse stations 16 wherein particles are removed from the sausage links by a spray of water. The spray can be manually activated and directed in order to assure adequate removal of meat particles and contaminants from the casings of the sausages.

The sausages can be transported to the pre-rinse stations by any suitable means. For example, a plurality of sausages can be hung from a rack or tree structure attached to a base having rollers so that the entire structure can be rolled across a support surface to the particular station. Further, the sausages can be transported by a rack or tree conveyed between the stations on a track system that suspends the racks above the ground or transported through a continuous cooler by means of a chain system. As will be readily apparent from the following description, the brine cleansing system of the present invention is usable with a variety of conveying structures.

After the sausages have been rinsed, they are conveyed to the smoking stations 18 where liquid smoke is added or sprayed onto the product so that the sausages will be provided with smoke flavoring. Thereafter, the sausages are conveyed to and cooked in the cooking stations 20.

After the sausages have been adequately cooked, they are conveyed to the hot water rinse stations 22. At these stations, the sausages are sprayed with water having a temperature of approximately 140° F. to 165° F. This elevated temperature of the rinse water increases the solubility of the excess liquid smoke previously applied to the sausages and the solubility of other contaminants which were not previously removed in the pre-rinse stations 16. Increasing the solubility of the excess liquid smoke and the contaminants enhances the effectiveness of the subsequent brine cleansing system, which will be more fully described below. In prior art processing systems, water applied at a hot water rinse station was not raised to this level. For instance, prior art systems normally used water having a temperature of approximately 120° F. in their hot water rinse immediately prior to the chilling of the meat product.

The sausage is then conveyed to the brine showers 24 wherein brine having a temperature of approximately 15° F.±5° F. is cascaded over the sausages. The brine used in the brine showers 24 preferably has a salinity of approximately 60°±10° salimeter.

The sausages normally remain in the brine shower 24 for approximately 10 to 20 minutes. The sausages are then removed from the shower. The exiting sausages have a temperature of approximately 15° F.±5° F. The sausages are then conveyed to a station (not shown) where they are packaged in their chilled condition.

Chilled brine is supplied to the brine showers 24 via the supply conduits 26. The chilled brine is forced from the brine chillers 30 through the supply conduits 26 by the pumps 28. The brine is passed through a screen filter (not shown) prior to flowing through the pumps 28. The brine chillers 30 utilize standard refrigeration equipment to chill the brine as is well-known to one of ordinary skill in the art. The flow of the chilled brine from the chillers 30 to the showers 24 is indicated by the arrows in FIG. 1.

After the brine has been sprayed onto and cascades off of the sausages in the brine showers, it is collected in sumps (not shown) located in each of the brine showers. The brine is then returned to the chillers via the drainage conduits 32 by using the pumps 34. The brine passes through the coarse filters 35 prior to reaching the pumps 34. The filters 35 are designed to remove contaminants having a size greater than 0.05 inches. Thus, the chilled brine is continuously circulated between the brine showers and the brine chillers to maintain the temperature within the brine showers at approximately 15° F. The brine showers with their corresponding brine chillers and the associated conduits and pumps form recirculating chilling circuits for supplying a spray of chilled brine to cool the sausages. As is apparent, the brine will adhere to the sausages located in the brine shower as the brine is cascaded over the sausages. Thus, it may be necessary during the operation of the recirculating chilling circuits to supply additional brine to the chilling circuits to provide a constant brine volume or add salt or brine of a different salinity to maintain the desired salinity of the brine in the circuits. Salt is added if there is an addition of water to the brine as a carryover from the smoke house water spray system.

The new brine needed for the chilling circuits can be supplied from a new brine supply conduit 36. The supply conduit 36 is in fluid communication with a salt tank and lixator 38 in which the brine is prepared. The structure of the lixator for producing the brine is well-known to one of ordinary skill in the art. In addition to supplying "makeup" brine to the chilling circuits, brine from the lixator 38 can be used to originally supply the chilling circuits for the start of operation.

At the end of a day or a cycle of processing using the chilling circuits, all of the brine in the chilling circuits is drained to a used brine storage tank 40 by using a pump 42 and a conduit 44. Prior to entering the storage tank 40, the brine is forced through serially positioned filters 46 and 48 which are located in the flow path of the conduit 44. The temperature of the brine in the storage tank 40 normally is approximately 30° F.±10° F.

As is apparent, after a day or cycle of processing, the brine circulating in the chilling circuits has accumulated various contaminants of varying sizes. For instance, meat particles and bacteria such as Coliform, E-coli and listeria monocytogenes may be found in the used brine. The filters 46 and 48 remove the larger size contaminants. However, in order to reuse the brine, it must be further cleansed to reduce the contaminants to acceptable levels that meet governmental standards.

The used brine within the storage tank 40 is conveyed to a membrane or like filtration unit 50 by a conduit 52 using a pump 54. The filtration unit is configured to remove contaminants from the brine that have a preselected size, preferably those having a molecular weight greater than approximately 20,000 to 50,000. However, lower molecular weight foulants, down to a molecular weight of 200, can be removed by selecting an appropriate membrane. The filtration unit utilizes a low-pressure membrane process for separating suspended solids from the brine without affecting the salinity of the brine. The unit uses a semi-permeable microporous membrane to perform the separation. In the filtration unit, brine is fed into an array of membrane modules and flows across the membrane surface. The water, low molecular weight ions (for example, chloride) and low molecular weight solids pass through the membrane and are removed as a permeate which can be reused in chilling circuits. High molecular weight suspended solids are rejected by the membrane and are further concentrated. At the end of the cleansing cycle they are discarded. Thus, the filtration unit removes suitable amounts of contaminants to cleanse the brine sufficiently to meet government standards. More particularly, it has been found that use of a membrane or like filtration unit which removes contaminants having a molecular weight greater than 20,000 to 50,000 results in sufficient removal of contaminants and retention of chloride to allow reuse of the brine in the chilling circuits. Other size membranes can be used to remove foulants down to 200 molecular weight.

After the used brine has been cleansed in the filtration unit 50 so that it can be reused, the brine is conveyed via a conduit 56 to a refrigerated brine storage tank 58. The temperature of the cleansed or reconditioned brine entering the storage tank 58 is approximately 30° F.±10° F. The storage tank 58 is cooled by standard refrigeration equipment to maintain the temperature of the brine within the tank. Additionally, an automatic turbidity monitor can be positioned in the conduit 56 to measure and record the turbidity of the brine.

Reconditioned brine from the storage tank 58 is supplied to the recirculating chilling circuits via a conduit 60 by a pump 62. The conduit 60 injects the reconditioned brine into the chilling circuits through the filters 35. The reconditioned brine can be used to resupply the chilling circuit at the beginning of a new processing cycle. Further, the reconditioned brine can be used to replenish brine lost during the chilling process by adhesion of brine to the meat product. The reconditioned brine can be used in this respect as an addition to or as an alternative to the new brine supplied by the conduit 36 from the holding tank 38.

Thus, the brine cleansing system of the present invention allows the reuse of the same brine in the chilling circuits for an extended period of time, thus dramatically reducing or eliminating the amount of brine that needs to be disposed at the end of each operational cycle. Hence, the chloride disposal problems associated with systems in the past can be greatly reduced if not eliminated.

As described above, the temperature of the water at the hot water rinse stations 22 is increased to approximately 140° F. to 165° F. from the normal 120° F. of prior art systems. This increased temperature increases the solubility of contaminants located on the sausages. It has been found that this increased solubility of the contaminants increases the effectiveness of the brine cleansing system and the filtration unit 50.

The present invention also is directed to a process for cleansing brine used in a recirculating chilling circuit. As described above, the chilling circuit has a brine shower 24 and a brine chiller 30 in fluid communication to allow recirculation of the brine. The brine is removed from the chilling circuit by the drain conduit 44. The brine is conveyed within the conduit from the chilling circuit to the used brine storage tank 40. The used brine within the storage tank is then conveyed and filtered within the filtration unit 50 to remove contaminants having a molecular weight greater than approximately 20,000 to 50,000. Thereafter, the cleansed or reconditioned brine is conveyed via the conduit 56 to the refrigerated brine storage tank 58. From the refrigerated storage tank, the reconditioned brine is returned to the chilling circuit via the conduit 60.

The process of the present invention further includes filtering the used brine prior to depositing the brine in the storage tank 40. Further, the process includes the rinsing of the meat product entering the brine showers with water having a temperature of approximately 140° F. to 165° F.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A system for cleansing brine used in a recirculating chilling circuit, the chilling circuit having a brine shower and a brine chiller in fluid communication to allow continuous recirculation of the brine, the system comprising:

a used brine receiving tank in fluid communication with the chilling circuit, said used brine tank holding the used brine discharged from the chilling circuit;

a filtration unit in fluid communication with said used brine tank and capable of removing contaminants having a molecular weight of approximately 200 and above from the brine; and a cleansed brine storage tank in fluid communication with said ultrafiltration unit and the chilling circuit, said cleansed brine tank for holding the brine after it has been cleansed by said filtration unit until it can be resupplied to the chilling circuit.

2. The system of claim 1, wherein said cleansed brine tank is refrigerated to maintain the brine at a specific temperature.

3. The system of claim 1, wherein said used brine storage tank is connected with the chilling circuit by a conduit, said conduit having a first filter and a second filter disposed in its fluid path, said first filter removing particles having a size greater than approximately 25 microns from the brine flowing therethrough and said second filter removing particles having a size greater than approximately 5 microns from the brine flowing therethrough.

4. A process for cleansing brine used in a recirculating chilling circuit, the chilling circuit having a brine shower and a brine chiller in fluid communication to allow continuous recirculation of the brine, the process comprising:

removing brine that has been used in the chilling circuit from the chilling circuit;

conveying the brine removed from the chilling circuit to a first storage tank;

filtering the brine from the storage tank in a filtration unit capable of removing particles having a molecular weight of approximately 200 and above;

conveying the filtered brine to a refrigerated storage tank; and returning the brine from the refrigerated storage tank to the chilling circuit.

5. The process of claim 4, wherein said brine is filtered by a first filter and by a second filter prior to being deposited in the first storage tank and after being removed from the chilling circuit, said first filter removing particles having a size greater than 25 microns from the brine and said second filter removing particles having a size greater than 5 microns from the brine.

6. The process of claim 4, wherein the food product chilled by the process is sprayed with water having a temperature of approximately 140° F. to 165° F. prior to entering the brine shower.

* * * * *